United States Patent [19]

Bansbach

[11] Patent Number: 5,779,013
[45] Date of Patent: Jul. 14, 1998

[54] TORQUE TRANSFER APPARATUS USING MAGNETORHEOLOGICAL FLUIDS

[75] Inventor: Eric A. Bansbach, Fayetteville, N.Y.

[73] Assignee: New Venture Gear, Inc., Troy, Mich.

[21] Appl. No.: 683,834

[22] Filed: Jul. 18, 1996

[51] Int. Cl.$^6$ .................................................. F16D 28/00
[52] U.S. Cl. ........................................ 192/21.5; 477/179
[58] Field of Search ................... 477/97, 179; 192/21.5

[56] References Cited

U.S. PATENT DOCUMENTS

| | | | |
|---|---|---|---|
| 4,896,754 | 1/1990 | Calrson et al. | 192/21.5 |
| 5,094,328 | 3/1992 | Palmer | 192/21.5 |
| 5,358,084 | 10/1994 | Schramm | 192/21.5 |
| 5,400,866 | 3/1995 | Wilson et al. | 180/247 |
| 5,469,947 | 11/1995 | Anzai et al. | 192/21.5 |
| 5,598,908 | 2/1997 | York et al. | 192/21.5 |
| 5,620,071 | 4/1997 | Ishikawa et al. | 192/21.5 |

FOREIGN PATENT DOCUMENTS

| | | | |
|---|---|---|---|
| 60-1432 | 1/1985 | Japan | 192/21.5 |
| 684211 | 9/1979 | U.S.S.R. | 192/21.5 |
| 1434177 | 10/1988 | U.S.S.R. | 192/21.5 |

*Primary Examiner*—Khoi Q. Ta
*Attorney, Agent, or Firm*—Harness, Dickey & Pierce, P.L.C.

[57] ABSTRACT

A fluid-based torque transfer device modulates the amount of torque which is transmitted from an input shaft to an output shaft. The torque transfer device includes a first plate connected to the input shaft. A second plate is connected to the output shaft and spaced from the first plate. A magnetorheological fluid is provided between the first and second plates. A magnetic circuit, including a coil wound around a core material defining a gap, applies a magnetic field to the magnetorheological fluid to variably control the rotation of the second plate in response to the rotation of the first plate. A controller adjusts the current to the coil to vary the magnetic field. Sensors detect at least one of the rotational speed and the torque of the input shaft, the output shaft, vehicle speed, steering direction, throttle position, gear position and brake position. The controller varies the current provided to the coil based thereon. Exemplary applications for the fluid-based torque transfer device include a fuse, a clutch between an engine and a transmission, and a transfer case for four wheel drive powertrains.

6 Claims, 5 Drawing Sheets

TORQUE TRANSFER APPARATUS USING MAGNETORHEOLOGICAL FLUIDS

BACKGROUND OF THE INVENTION

1. Technical Field

This invention relates generally to torque transfer control apparatus, more particularly, to torque transfer control apparatus which employs a magnetic field to control the properties of a fluid to vary the coupling between two or more surface plates.

2. Background

An automobile transmission transmits engine rotation and power from an engine flywheel which is coupled to an input shaft of the transmission to a rear propshaft which is coupled to an output shaft of the transmission. The transmission employs various gear ratios depending upon speed and/or power desired by the driver. When shifting between gears, clutch plates temporarily decouple the engine flywheel from the rear propshaft. The clutch plates are thereafter reengaged to transfer torque from the engine flywheel to the rear propshaft. Thus, the clutch plates and associated actuator control the transfer of torque between the engine and the rear propshaft. A analogous mechanism is employed in transfer cases of four wheel drive vehicles.

Conventional methods of controlling the magnitude of torque supplied to the rear propshaft include controlling the mechanical or frictional braking at the clutch plates, controlling the speed of the engine flywheel using the throttle, and/or employing fluid-based torque coupling systems.

Fluid-based torque coupling systems generally include a pair of surface plates, an input-side surface plate connected by the input shaft to a torque supply and the an output-side surface plate connected by the output shaft to a rear propshaft or another output device. In conventional fluid-based systems, the input and output surface plates are immersed in a viscoelastic fluid or an electrorheological fluid.

The properties of the viscoelastic or electrorheological fluid cause a "fluidic couple" to form between the two surface plates. The fluidic couple controllably facilitates torque transmission between the surface plates by forcing the output-side surface plate attached to the output shaft to rotate in response to the rotation of the input-side surface plate connected to the input shaft.

While viscoelastic fluids have provided some distinct advantages over conventional mechanical and rotational mechanisms for torque transmission control, there are several inherent difficulties with systems employing viscoelastic fluids. Torque transmission between the input and output surface plates is governed solely by the properties of the viscoelastic fluid. In particular, viscoelastic fluids have a fixed relationship between their rheological properties and various environmental parameters. At any given temperature, the viscosity, coherence and maximum sheer coefficients of the fluid are constant. As temperature increases, usually due to friction or interstitial molecular dynamics (sheer thinning within the viscoelastic fluid), the torque transmission efficiency of the viscoelastic fluid normally declines due to reduced coherence and/or viscosity. The net result is increasing "fluid slip" which eventually causes pseudo-solid cracks or fractures and, as a result, torque transmission pulsing or cessation.

Electrorheological fluids are suspensions which exhibit a change in their flow characteristics and viscosity upon the application of an electric field. With electrorheological fluids, the relationship between rheological and environmental parameters are more easily controlled over a specific bandwidth of operating conditions than with normal viscoelastic fluids.

By controllably altering the electrical field applied to the contained electrorheological fluid medium in which a pair of input and output surface plates are immersed, the magnitude of torque transmitted between the input and output surface plates and between the torque supply and the output device can be controlled more precisely than systems employing viscoelastic fluids.

Fluid-based systems employing electrorheological fluids, however, also have significant drawbacks. Electrorheological fluids require a high electric field to initiate a change between liquid and pseudo-solid phases. For typical applications, voltages in the range of approximately 1,000 volts are required. Voltages in this range, however, are undesirable from a reliability stand point. The insulation for high voltage contacts are susceptible to cracks and degradation due to moisture, corrosion and temperature extremes. Once the insulation for the high voltage contacts is compromised, the high voltage supply presents both safety and functional problems. Furthermore, most automotive manufacturers do not allow or provide for high voltages in vehicle electrical systems. The voltage range which must be provided for electrorheological fluid-based torque transfer apparatus is clearly well above the acceptable levels for the automotive industry which is a primary user of torque transfer devices.

To control the phase of the electrorheological fluid, an electrical field must be created by placing voltage nodes on opposite sides of a fluid channel. Spacing between the nodes must be very small despite the high voltage range employed. The node spacing, however, varies with drivetrain vibration. If the spacing decreases below a critical value, the electrorheological fluid breaks down due to high voltage stress. When break down occurs, the high voltage supply is shorted out and shuts down. As can be appreciated, when the voltage supply shuts down, the electrical field applied to the electrorheological fluid terminates. Without the electrical field, the electrorheological fluid is in the liquid states and little or no torque is transferred between the input and output surface plates.

Electrorheological fluids must also be stored and handled in a very controlled manner. Any particulates such as dust, water, and dirt which contaminate the electrorheological fluid will cause a voltage breakdown between the two voltage nodes. Once a breakdown occurs, carbon build-up appears on the node and in the fluid. As carbon build-up increases, further breakdowns occur. As can be appreciated, the cost and complexity of handling electrorheological fluids is therefore very high.

SUMMARY OF THE INVENTION

Accordingly, the present invention is directed to an improved fluid-based torque transfer device. The torque transfer device employs a magnetorheological fluid medium which changes between liquid and semi-solid states when a magnetic filed is applied or removed. The magnetorheological fluid is provided between first and second spaced plates. The magnetic field is modulated to variably control the rotation of the second plate in response to the rotation of the first plate.

The torque transfer device according to the invention has an input shaft and an output shaft. The torque transfer device modulates the amount of torque which is transmitted from the input shaft to the output shaft. The torque transfer device includes a first plate connected to the input shaft and a second plate connected to the output shaft and spaced from the first plate. Magnetorheological fluid is provided between the first and second plates. A magnetic circuit means applies a magnetic field to the magnetorheological fluid to variably control the rotation of the second plate in response to the rotation of the first plate.

The magnetic circuit means may further include a coil wound around a core material which defines a gap. Preferably, the first and second plates are partially located in the gap. A control means, coupled to the coil, controllably applies current to the coil to vary the magnetic field. A first sensing means, coupled to the control means, detects at least one of the rotational speed and the torque of the output shaft. The control means varies the current provided to the coil based thereon. The control means also varies the current provided to the coil based upon at least one of vehicle speed, steering direction, throttle position, gear position and brake position.

In one form of the invention, the torque transfer device is associated with a vehicle having a torque supply, a transmission and front and rear driveshafts. The torque transfer device controllably couples torque from the torque supply and the transmission to the front driveshaft, the rear driveshaft, or both the front and rear driveshafts.

In another form of the invention, the torque transfer device is associated with a vehicle including a torque supply and a transmission. The torque transfer device operates as a clutch and is coupled between the torque supply and the transmission.

In still another form of the invention, the torque transfer device is associated with a vehicle including a torque supply, a transmission and a rear differential. The torque transfer device operates as a fuse between the transmission and the differential.

BRIEF DESCRIPTION OF THE DRAWINGS

The various advantages of the present invention will become apparent to those skilled in the art after studying the following specification and by reference to the drawings in which:

FIG. 1 is a functional illustration of a magnetic circuit according to the prior art;

FIG. 4a is a functional block diagram of an electronic control system for the torque transfer control system of FIGS. 2 and 3;

FIG. 4b is a functional block diagram of an electronic control module of the electronic control system of FIG. 4a;

DESCRIPTION OF THE PREFERRED EMBODIMENT

Figures 1, 4A, 4B:
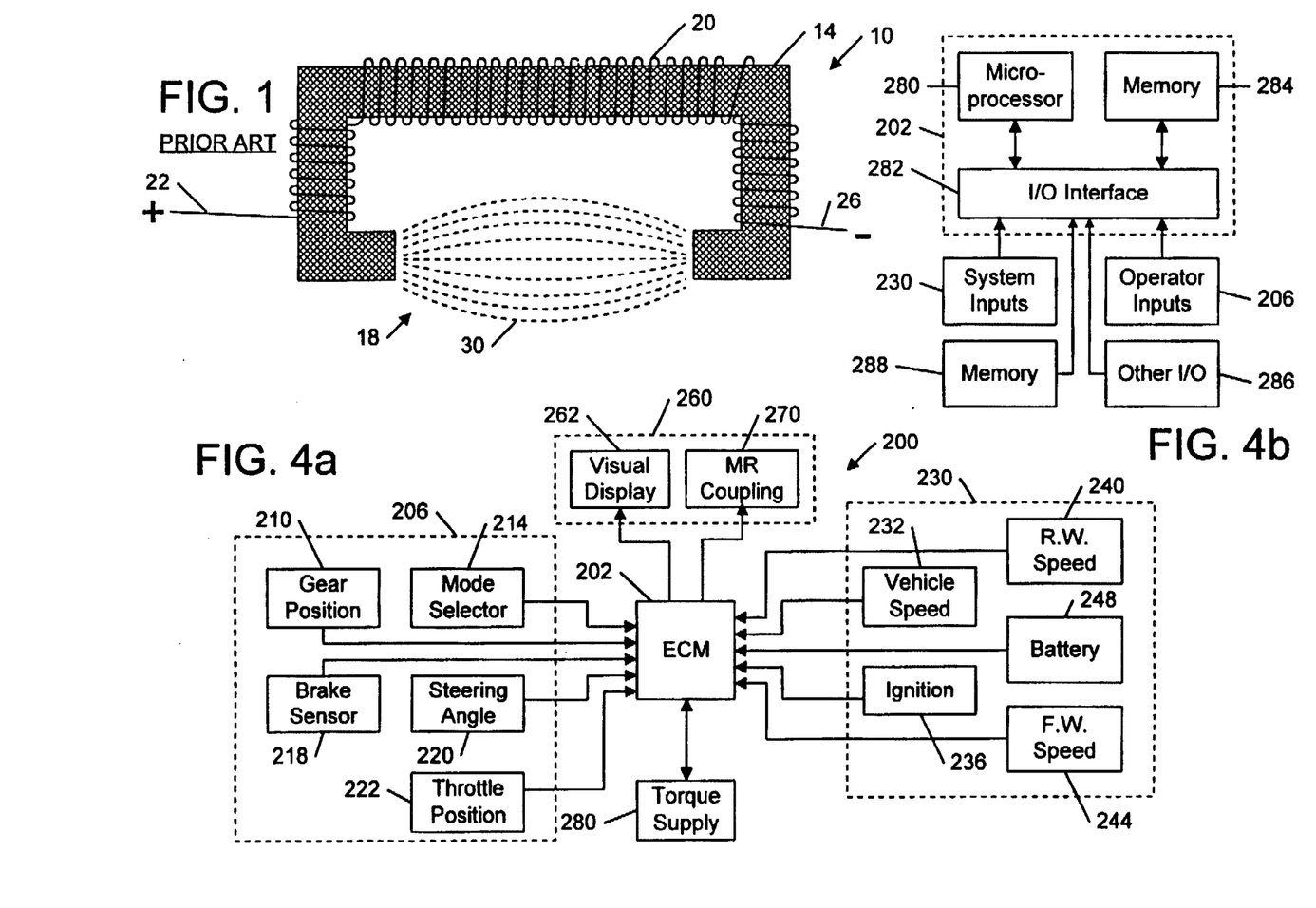

In FIG. 1, a magnetic circuit according to the prior art is generally designated 10. Magnetic circuit 10 includes a core material 14 which defines an air gap 18. Preferably core material 14 comprises a ferrous material such as steel. A coil 20 is wrapped around core material 14 a plurality of times (or turns). One end or node 22 of coil 20 is coupled a positive lead of a current source and an opposite end or node 26 of coil 20 is coupled to a negative lead of the current source. When current flows through coil 20, a magnetic field is created in core material 14 and in air gap 18. The strength of magnetic field 30 in air gap 18 is dependent upon the mass of core material 14, the number of turns of coil 20, and the current through coil 20.

Figure 2:
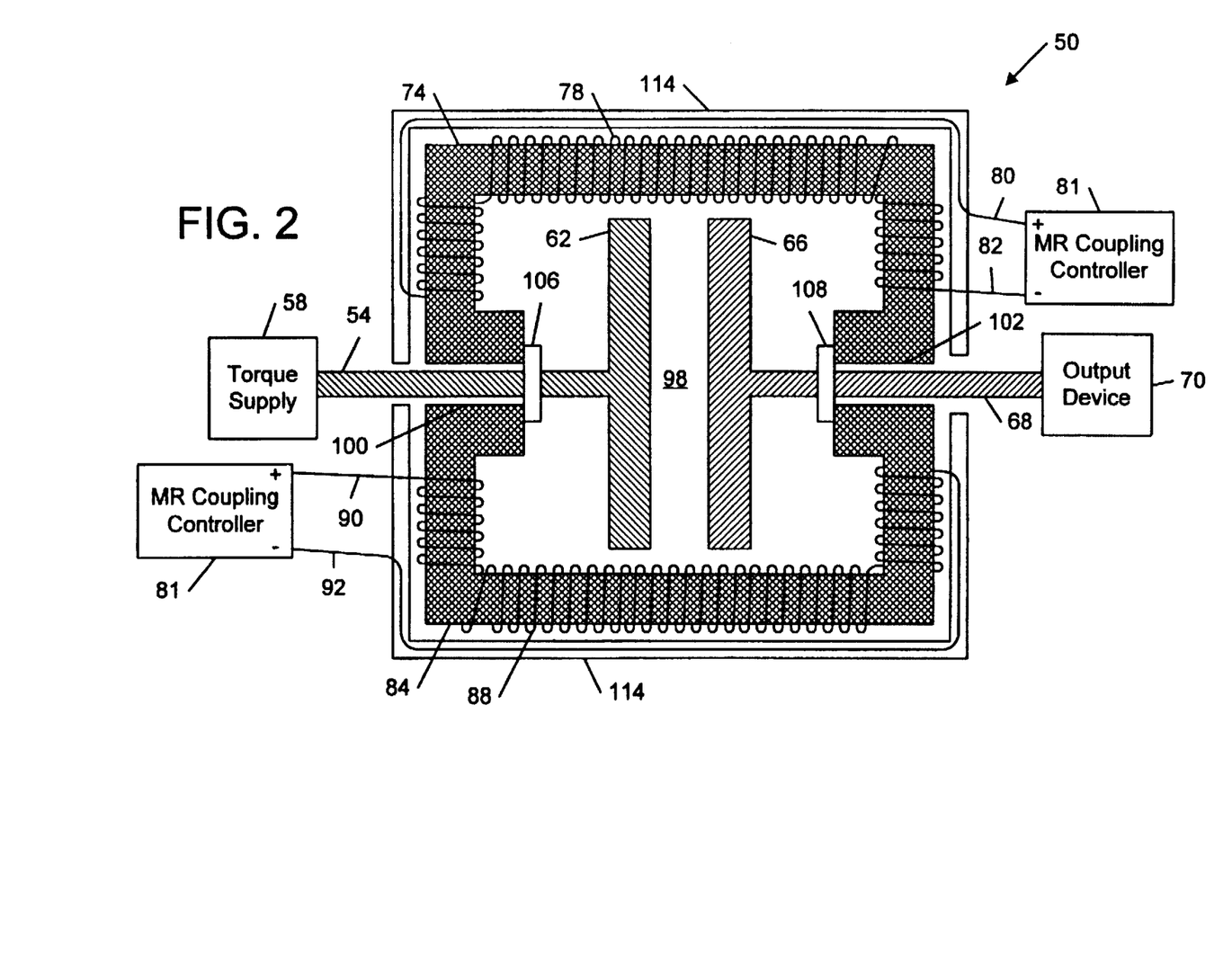
FIG. 2 is a functional illustration of a torque transfer control system employing first and second surface plates.

Referring now to FIG. 2 of the drawings, a torque transfer control system of the present invention is illustrated generally at 50. A torque input shaft 54 rotates under the influence of a torque supply device 58 such as an electric motor, an internal combustion engine, a wind turbine, etc. The speed and horsepower of torque supply device 58 determines the magnitude of torque transmitted along input shaft 54 less friction or other losses.

Torque input shaft 54 is mechanically coupled to a first surface or clutch plate 62. Rotation of torque input shaft 54 causes a corresponding rotation of first surface plate 62 at the same speed as torque input shaft 54. A second surface or clutch plate 66 is mechanically connected by a torque output shaft 68 to an output device 70. Rotation of second surface plate 62 causes a corresponding rotation of torque output shaft 68.

Torque transfer control system 50 further includes a first core material 74 and a coil 78 wound on first core material 74. One end or node 80 of coil 78 is connected to a positive lead of a magnetorheological coupling controller 81. An opposite end or node 82 is coupled to a negative lead of magnetorheological controller 81. A second core material 84 likewise includes a coil 88 would thereon. One end or node 90 of coil 88 is coupled to a positive lead of magnetorheological coupling controller 81. An opposite end or node 92 of coil 88 is coupled to a negative lead of magnetorheological coupling controller 81. Skilled artisans can appreciate that a single magnetorheological controller 81 can control the current applied to both coils 78 and 88. Alternately, the function of magnetorheological controllers 81 can be incorporated into another controller such as an electronic control module (ECM) of an automobile as shown in FIGS. 4–7.

Both the first and second surface plates 62 and 66 are immersed in a magnetorheological fluid medium which is generally designated 98. Preferably, magnetorheological fluid medium 98 is contained by an interior surface of core materials 74 and 84. Alternately an inner casing or housing (not shown) may be provided to protect coils 78 and 88. First and second surface plates 62 and 66 and first and second core materials 74 and 84 preferably have a circular cross-section. The size of first and second surface plates 62 and 66, first and second core materials 74 and 84 and the volume of magnetorheological fluid medium 98 are determined by the specific properties of the magnetorheological fluid medium chosen as well as the performance specifications of the torque transfer control system 50.

Input shaft 54 and output shaft 68 pass through axially-aligned openings 100 and 102 defined by core materials 74 and 84. Seals 106 and 108 are also preferably placed between openings 100 and 102 and the magnetorheological fluid medium 98 to prevent leakage. Magnetorheological coupling controller(s) 81 provide current through coils 78 and 88 in a controlled manner. A unitary or multipiece outer casing or housing 114 is preferably provided to enclose torque transfer control device 50.

Torque transfer control system 50 provides a magnetically controlled fluid coupling between first and second surface plates 62 and 66. Magnetorheological fluid medium 98 contains magnetically polarized particles. When a magnetic field is applied to magnetorheological fluid medium 98, particle chains form. In effect, magnetorheological fluid medium 98 in torque transfer control system 50 changes from a free flowing state towards a high viscous state when current is steadily increased through coils 74 and 78. Various intermediate levels of viscosity can be obtained by varying the magnetic field applied to magnetorheological fluid 98. Preferably magnetorheological fluid medium 98 is a mineral oil based fluid or a silicon oil based fluid.

Magnetorheological fluid medium 98 is a controllable fluid which changes from a free flowing liquid to a semi-solid when a magnetic field is applied. When the magnetic field is removed, the magnetorheological fluid medium 98 returns to its original liquid state. Advantageously, the response time for magnetorheological fluid medium 98 to change between a steady-state semi-solid phase to a steady-state fluid phase is the millisecond range. Therefore torque transfer control changes can be performed quickly. Furthermore, magnetorheological fluid medium 98 can be operated at specific intermediate viscosities between the fluid state and the high viscosity state.

Magnetorheological fluids have yield strengths that have only minor variations over a temperature ranges between −40° and +150° Celsius (−40° to 302° Fahrenheit). This temperature range advantageously includes the automotive operating temperature range.

Magnetorheological fluids are not affected by minor chemical impurities including water. Therefore, less restrictive and cheaper manufacturing processes may be employed. Magnetorheological fluids are non-toxic, environmentally safe, and compatible with most other materials employed in automotive manufacturing.

While magnetorheological fluids require some agitation to periodically redisperse the polarized particles, this requirement is not a problem for torque transfer control systems according to the present invention. During operation, first and second surface plates 62 and 66 rotate and keep the suspended polarized particulate matter dispersed.

Because torque transfer control system 50 does not require shift forks or motor actuators which are moving parts, the reliability of torque transfer control system 50 is increased and maintenance is reduced. Furthermore, the cost of torque transfer control system 50 is significantly reduced through the elimination of the motor actuators which are a relatively expensive component.

Figure 3:
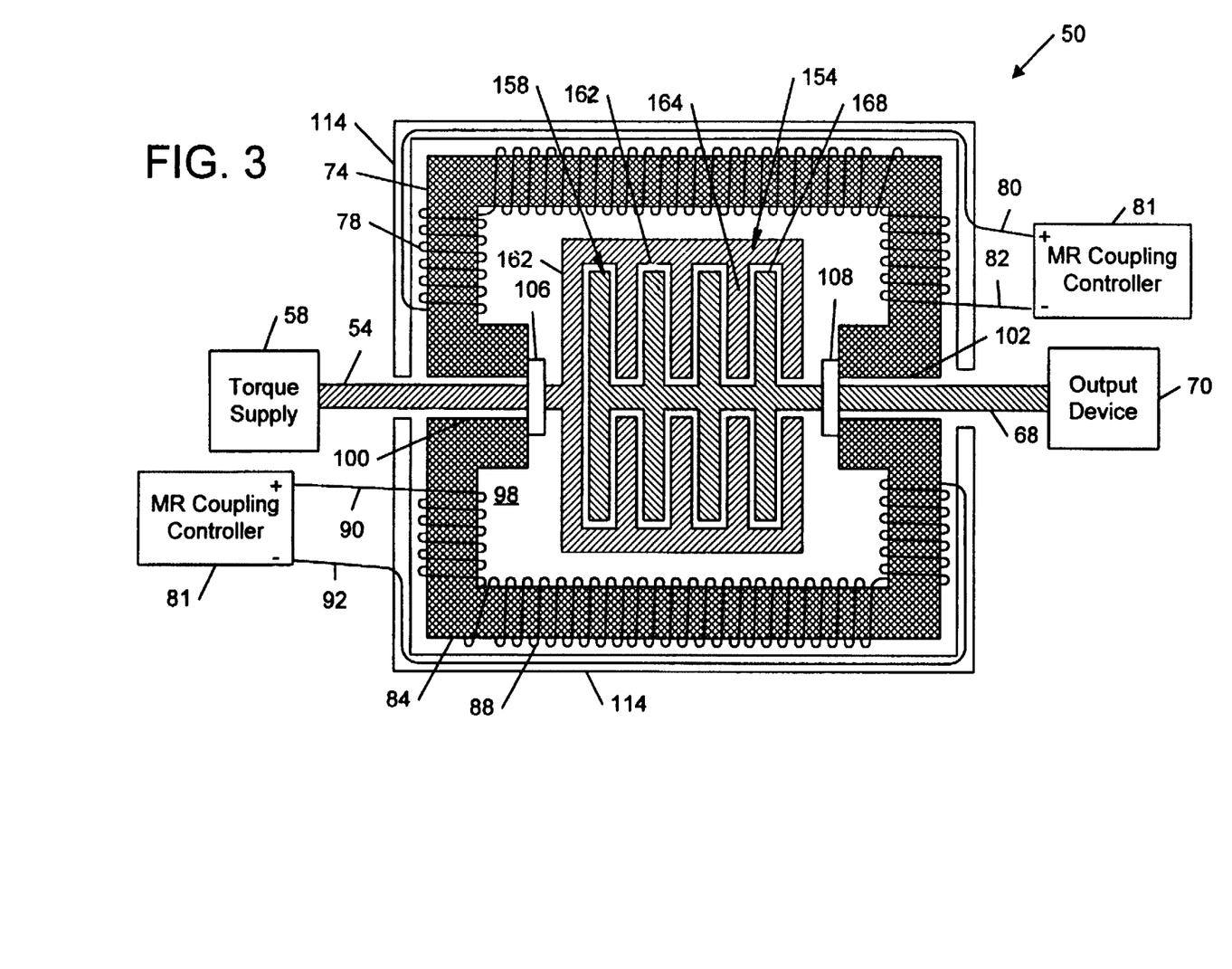
FIG. 3 is a functional illustration of the torque transfer control system of FIG. 2 employing alternate first and second surface plates.

Referring now to FIG. 3, the first and second surface or clutch plates of torque transfer control system 50 of the present invention can have other configurations. For example, first and second surfaces or clutch plates 154 and 158 in FIG. 3 have a plurality of engaging surfaces. First surface plate 154 includes a "C"-shaped outer member 162 which substantially encloses second surface plate 158. First surface plate 154 further includes multiple engaging members 164 which extend radially inwardly from "C"-shaped outer member 162. Mating engaging members 168 of second surface plate 158 extend radially outward from output shaft 68. As can be appreciated, the variable rheological properties of magnetorheological fluid medium 98 controls the transfer of torque between first and second surface plate 154 and 158 in the manner previously described above. Still other shapes and configurations for first and second surface plates can be employed and will be readily apparent to skilled artisans.

Referring to FIG. 4a, a magnetorheological controller for a torque transfer control system 50 is generally designated 200. An electronic control module 202 is coupled to one or more operator inputs 206 which preferably include one or more of the following: a gear position sensor 210 which generates a gear position signal which identifies the current operating gear; a mode selector 214 which generates a mode signal specifying a desired powertrain operation such as front wheel drive, rear wheel drive, four wheel drive (high-lock), four wheel drive (low-lock), etc.; a brake sensor 218 for generating a brake signal when the brakes are engaged; a steering angle sensor 220 which generates a steering signal based on the angular position of the steering wheel; and/or a throttle sensor 222 which generates a signal which indicates the position of the throttle.

Electronic control module 202 is also coupled to one or more system inputs 230 which preferably include one or more of the following: vehicle speed sensor 232 which provides a signal indicating the vehicle's speed; an ignition sensor 236 which provides a signal indicating the operational status of the vehicle; a rear wheel speed sensor 240 which generates a signal based upon the rotational speed or torque of the rear drive shaft; a front wheel speed sensor 244 which generates a signal based upon the rotational speed or torque of the front drive shaft; and/or a battery 248 for providing power to electronic control module 202.

Electronic control module 202 is further coupled to system outputs 260, which preferably include a visual display 262 and a magnetorheological coupling 270 associated with torque transfer. Electronic control module 202 may further be connected to torque supply 280 if desired.

Referring to FIG. 4b, electronic control module 202 preferably includes a microprocessor 280, an input/output interface 282, and internal and/or external memory 284 and 288. A suitable control algorithm stored in memory 284 and/or 288 analyzes operational and control parameters, sensor inputs, etc. and provides a controllable output current to magnetorheological coupling 270. A suitable analogous control algorithm is set forth in commonly assigned U.S. Pat. No. 5,400,866 which is entitled "Torque Modulated Transfer Case" and which is hereby incorporated by reference.

Figure 5:
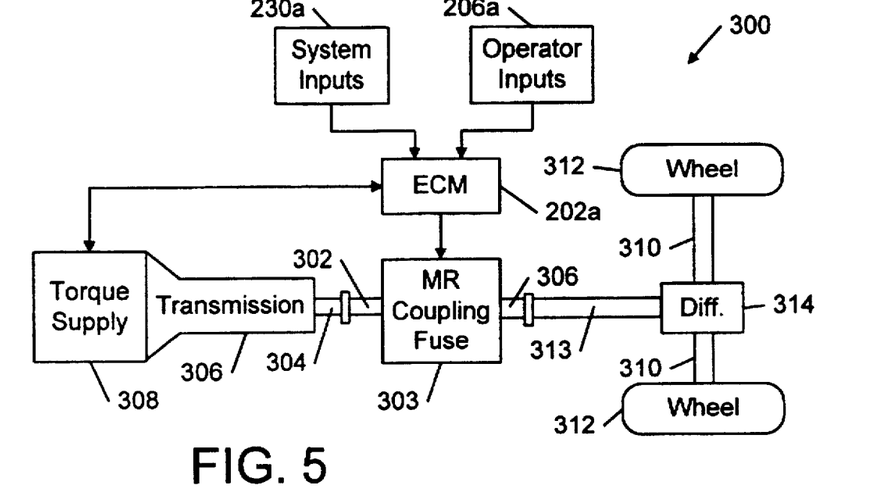
FIG. 5 is a functional block diagram of a torque transfer control system employed as a controllable fuse between the transmission and the differential of a powertrain.
Figure 6:
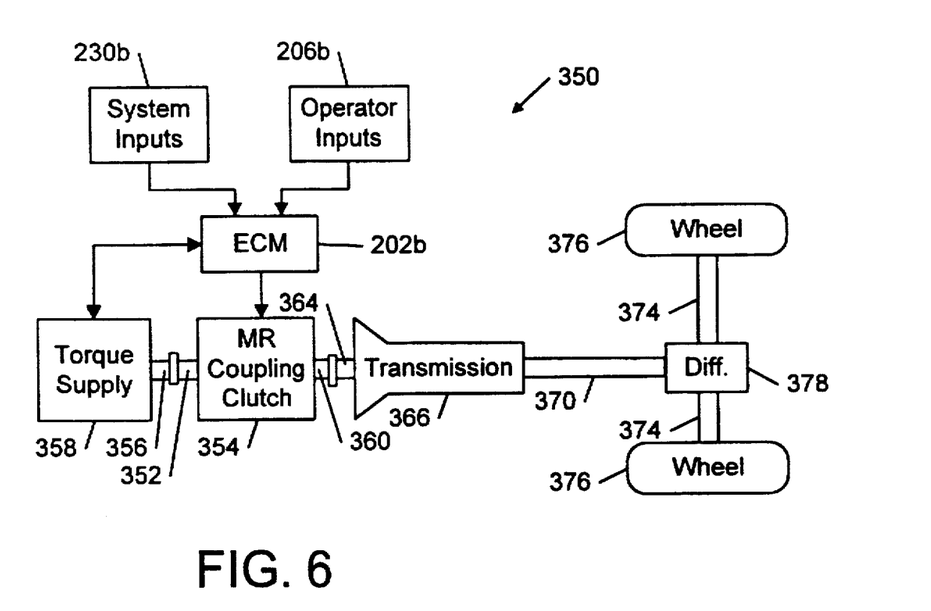
FIG. 6 is a functional block diagram of a torque transfer control system employed as a clutch between a torque supply and transmission of a powertrain.
Figure 7:
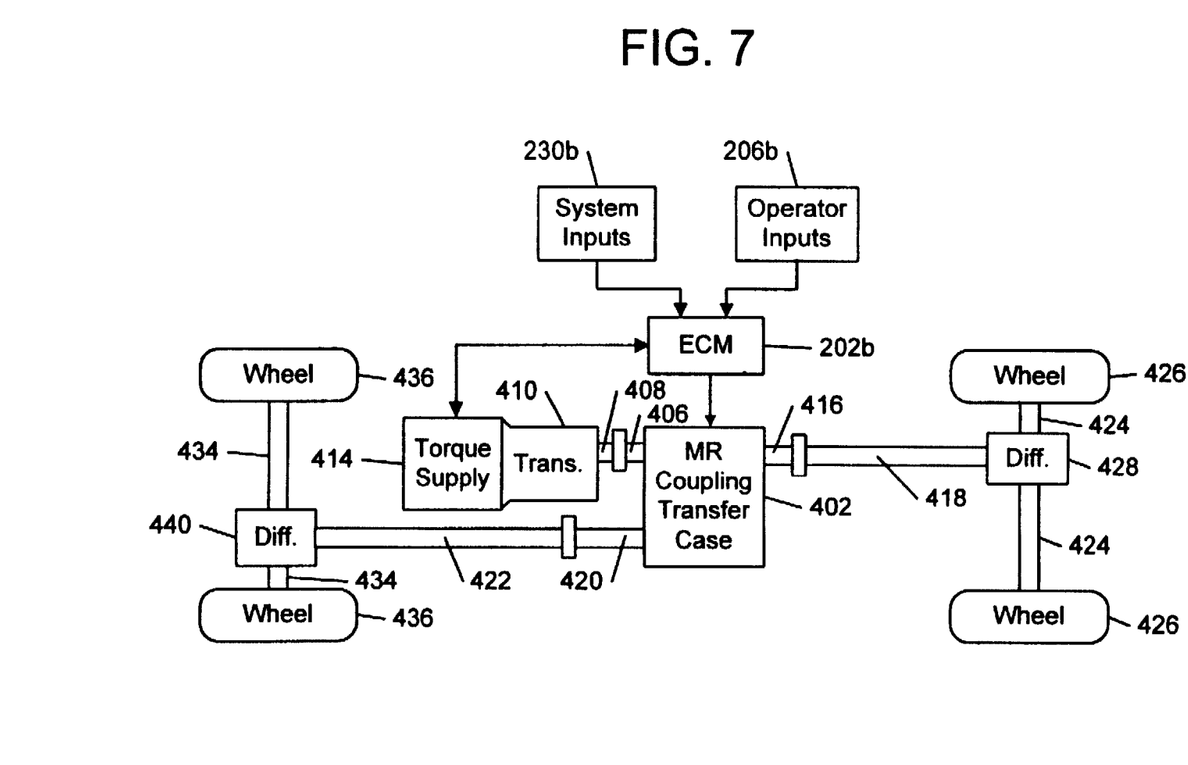
FIG. 7 is a functional block diagram of a torque transfer control system employed as a transfer case for a 4-wheel drive powertrain.

Referring to FIGS. 5–7, various exemplary applications for the torque transfer control system according to the present invention are shown. In FIG. 5, a torque transfer control system 300 operates as an in-line fuse to provide powertrain protection by modulating or ceasing torque transmission during operating conditions likely to cause damage to various powertrain components. In this embodiment, a torque input shaft 302 of a magnetorheological coupling fuse 303 is driven by an output shaft 304 of a transmission 306 powered by torque supply 308 such as an engine. A torque output shaft 306 of magnetorheological coupling fuse 303 is coupled to a rear axle 310 and wheels 312 by a rear propshaft 313 and a differential 314.

Electronic control module 202a senses one or more operating conditions or parameters from operator inputs 206a, system inputs 230a, and/or torque supply 308 and controls current output to the coil(s) of magnetorheological coupling fuse 303. When operating conditions and/or parameters indicate that damage to powertrain components is likely, electronic control module 202a increases or reduces torque transfer in an appropriate manner.

Referring to FIG. 6, a torque transfer control system 350 operates as a clutch. An input shaft 352 of magnetorheological coupling clutch 354 is connected to a fly-wheel 356 of a torque supply 358 such as an internal combustion engine. An output shaft 360 of magnetorheological coupling clutch 354 is connected to an input shaft 364 of a transmission 366. A rear propshaft 370 connected to transmission 366 is coupled to a rear axle 374 and rear wheels 376 by a differential 378.

Torque transfer control system 350 controls the magnetic field across the magnetorheological fluid medium housed within magnetorheological coupling clutch 354 to transfer torque from torque supply 358 to transmission 366. Magnetorheological coupling clutch 354 allows transmission 366 to be engaged and disengaged from the torque supply during gear shifts using purely electrical actuation. Electronic control module 202b senses one or more operating conditions or parameters from operator inputs 206b, system inputs 230b and/or torque supply 358. Electronic control module 202b applies a controllable current to the magnetorheological coupling clutch 354 to allow engagement of the clutch without physically requiring a clutch pedal to be operated by a vehicle driver.

Control of magnetorheological coupling clutch 354 is dictated by electronic control module 202b which determines proper clutch engagement or disengagement speed and timing using control parameters and operational and system inputs. Some torsional vibration of the crank shaft will be attenuated due to the magnetorheological coupling clutch 354. The damping characteristics may also be changed by varying the magnetic field. In this manner, "on the fly" tuning may be accomplished. Intentional slipping of the magnetorheological coupling clutch 354 may also easily be achieved to dampen gear rattle during prime rattle conditions such as low speed, high load, launch, etc.

In FIG. 7, a torque transfer control system 400 for four wheel drive vehicles includes a magnetorheological coupling transfer case 402 having an input shaft 406 connected to an output shaft 408 of a transmission 410 and a torque supply 414 such as an engine. Magnetorheological coupling transfer case 402 selectively transfers torque from the input shaft 406 to a first output shaft 416 which is coupled to a rear propshaft 418 and/or to a second output shaft 420 which is coupled to a front propshaft 422. Rear propshaft 418 is coupled to a rear axle 424 and rear wheels 426 by a differential 428. Front propshaft 422 is coupled to a front axle 434 and wheels 436 by a front differential 446. As can be appreciated, the transfer clutch of conventional transfer cases can be replaced by magnetorheological coupling transfer case 402.

In the normal case, input shaft 406 and rear output shaft 416 are fixedly connected for rotation. A first surface plate is connected to input shaft and rotates therewith. A second surface plate rotates about the input shaft and is fluidly coupled for rotation with first surface plate by the magnetorheological fluid medium. A chain drive or other suitable mechanical device rotatably connects the rotatable second surface plate with the second output shaft. A suitable analogous structure is disclosed in commonly assigned U.S. Pat. No. 5,400,866 which is entitled "Torque Modulated Transfer Case" and which is hereby incorporated by reference. As can be appreciated, a magnetorheological coupling replaces the conventional transfer clutch disclosed therein. The actuator mechanism and shift forks are omitted.

Skilled artisans can appreciate that input shaft 406 and rear output shaft 416 can also be coupled by a magnetorheological coupling if desired. A magnetorheological coupling transfer case employing two magnetorheological coupling interfaces can operate in either front wheel drive, rear wheel drive or four wheel drive modes.

The foregoing discussion discloses and describes exemplary embodiments of the present invention. One skilled in the art will readily recognize from such discussion, and from the accompanying drawings and claims, that various changes, modifications and variations can be made therein without departing from the true spirit and fair scope of the invention as defined in the following claims.

What is claimed is:

1. A torque transfer control system comprising:

a torque supply source;

a transmission coupled to said torque supply;

first and second front axle driveshafts;

a front differential coupled between said first and second rear axle driveshafts;

a front propshaft;

first and second rear axle driveshafts;

a rear differential coupled between said first and second rear axle driveshafts;

a rear propshaft;

a fluidic coupling device which operates as a transfer case between said transmission and said front and rear differentials including an input shaft coupled to said transmission, a first output shaft coupled to said front propshaft, a second output shaft coupled to said rear propshaft, a first plate connected to said input shaft, a second plate connected to at least one of said first and second output shafts and spaced from said first plate, means for providing a magnetorheological fluid medium between said first and second plates, and magnetic circuit means for applying a magnetic field to said magnetorheological fluid to variably control the rotation of said second plate in response to the rotation of said first plate;

first sensing means for detecting at least one of the rotational speed and the torque of said output shaft; and control means, coupled to said first sensing means and said magnetic circuit means, for controlling the magnitude of said magnetic field.

2. The torque transfer device of claim 1 wherein said magnetic circuit means includes:

a core material defining a gap; and a coil wound around said core material.

3. The torque transfer device of claim 2 wherein said first and second plates are partially located in said gap.

4. The torque transfer device of claim 2 wherein said control means varies current passing through said coil to vary said magnetic field.

5. The torque transfer device of claim 4 further comprising:

second sensing means, coupled to said control means, for detecting at least one of the rotational speed and the torque of said input shaft, wherein said control means varies said current provided to said coil based thereon.

6. The torque transfer device of claim 4 wherein said control means varies the current provided to said coil based upon at least one of vehicle speed, steering direction, throttle position, gear position and brake position.

* * * * *

UNITED STATES PATENT AND TRADEMARK OFFICE
CERTIFICATE OF CORRECTION

PATENT NO. : 5,779,013

DATED : July 14, 1998

INVENTOR(S) : Bansbach

It is certified that error appears in the above-identified patent and that said Letters Patent is hereby corrected as shown below:

Column 8, line 18, delete "rear" and insert --front--.

Signed and Sealed this

Eighteenth Day of May, 1999

Attest:

Q. TODD DICKINSON

Attesting Officer

Acting Commissioner of Patents and Trademarks

UNITED STATES PATENT AND TRADEMARK OFFICE
CERTIFICATE OF CORRECTION

PATENT NO. : 5,779,013
DATED : July 14, 1998
INVENTOR(S) : Eric A. Bansbach

It is certified that error appears in the above-identified patent and that said Letters Patent is hereby corrected as shown below:

Title page: Item [56] Under U.S. Patent Document, Reference 4,896,754,

"Calrson" should be --Carlson--.

Column 1, line 24, "A" should be --An--.

Column 1, line 33 (second occurrence), delete --the--.

Column 4, line 4, after "couple" insert --to--.

Column 4, line 34, "would" should be --wound--.

Signed and Sealed this

Fourteenth Day of September, 1999

Attest:

Q. TODD DICKINSON

*Attesting Officer*     *Acting Commissioner of Patents and Trademarks*